(12) United States Patent
Fukitani

(10) Patent No.: US 8,491,441 B2
(45) Date of Patent: Jul. 23, 2013

(54) HYBRID VEHICLE CONTROL DEVICE

(75) Inventor: Aki Fukitani, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 437 days.

(21) Appl. No.: 12/839,869

(22) Filed: Jul. 20, 2010

(65) Prior Publication Data

US 2011/0021312 A1 Jan. 27, 2011

(30) Foreign Application Priority Data

Jul. 24, 2009 (JP) .................................. 2009-173030

(51) Int. Cl.
*B60W 10/02* (2006.01)
*B60W 10/06* (2006.01)
*B60W 10/08* (2006.01)

(52) U.S. Cl.
USPC ................................................ 477/5; 477/83

(58) Field of Classification Search
USPC .......................................................... 477/5, 83
See application file for complete search history.

(56) References Cited

U.S. PATENT DOCUMENTS

| | | | | |
|---|---|---|---|---|
| 6,026,921 A * | 2/2000 | Aoyama et al. | ............. | 180/65.25 |
| 6,471,620 B2 * | 10/2002 | Lee | ................ | 477/181 |
| 6,709,364 B2 * | 3/2004 | Eguchi et al. | ..................... | 477/5 |
| 6,881,167 B2 * | 4/2005 | Inada | ................ | 477/5 |
| 7,347,802 B2 * | 3/2008 | Tatara et al. | ..................... | 477/5 |
| 7,885,737 B2 * | 2/2011 | Hirata et al. | .................. | 477/166 |
| 7,954,581 B2 * | 6/2011 | Tanishima | ........................ | 477/5 |
| 8,002,059 B2 * | 8/2011 | Tanishima | ............... | 180/65.275 |
| 2005/0155803 A1 | 7/2005 | Schiele | | |
| 2009/0308673 A1 | 12/2009 | Seel | | |

FOREIGN PATENT DOCUMENTS

| | | |
|---|---|---|
| DE | 102004002061 A1 | 8/2005 |
| DE | 102006022395 A1 | 11/2007 |
| DE | 102007055832 A1 | 6/2009 |
| EP | 1795423 A1 | 6/2007 |
| JP | 2004-176710 | 6/2004 |
| JP | 2007-064097 | 3/2007 |
| JP | 2007-253780 | 10/2007 |
| JP | 2010-132074 | 6/2010 |

OTHER PUBLICATIONS

An English translation of the Chinese Office Action of corresponding Chinese Application No. 201010238568.9, issued on Sep. 29, 2012.

(Continued)

*Primary Examiner* — Justin Holmes
*Assistant Examiner* — Jacob S Scott
(74) *Attorney, Agent, or Firm* — Global IP Counselors, LLP

(57) ABSTRACT

A hybrid vehicle control device is provided with an engine stop control section and a fuel injection control section. The engine stop control section is configured to issue an engine speed reduction command to reduce an engine speed of an engine during an engine stopping operation occurring in response to establishment of an engine stop condition by using an electric motor and slip engaging a drive-wheel side clutch disposed between the electric motor and a drive wheel such that the drive-wheel side clutch transmits rotational torque between the electric motor and the drive wheel. The fuel injection control section is configured to issue a fuel injection command to continue fuel injection during the engine stopping operation until the engine speed decreases below a prescribed engine speed whereupon the fuel injection is stopped.

13 Claims, 6 Drawing Sheets

OTHER PUBLICATIONS

An English translation of the Japanese Office Action of corresponding Japanese Application No. 2009-173030, dated May 26, 2011 and mailed May 31, 2011.

The extended European Search Report for the corresponding European Patent Application No. 10007635.5-2421 dated Aug. 29, 2011.

An English translation of the Chinese Written Notification of Opinion Upon the Second Examination of corresponding Chinese Application No. 201010238568.9, issued on May 13, 2013.

\* cited by examiner

HYBRID VEHICLE CONTROL DEVICE

CROSS-REFERENCE TO RELATED APPLICATIONS

This application claims priority to Japanese Patent Application No. 2009-173030, filed on Jul. 24, 2009. The entire disclosure of Japanese Patent Application No. 2009-173030 is hereby incorporated herein by reference.

BACKGROUND

1. Field of the Invention

The present invention generally relates to a hybrid vehicle control device. More specifically, the present invention relates to hybrid vehicle control device for implementing engine stop control in order to maintain the efficiency of exhaust purification during restarting of the engine, the control device having a drive mode in which travel is accomplished by one or both of an engine and a motor.

2. Background Information

One example of a conventional hybrid vehicle control device is disclosed in Japanese Laid-Open Patent Publication No. 2007-64097 for a hybrid vehicle equipped with a three-way catalytic converter in the engine exhaust path for simultaneously purifying emissions in exhaust gas (HC, CO and NOx) by maintaining a theoretical air fuel ratio in a catalyst atmosphere. In this conventional hybrid vehicle control device, an engine stop control is performed for stopping the engine so that the purification efficiency of an exhaust purification catalyst is maintained during engine restarting. In this engine stop control, when the engine is stopped, the output shaft of the engine is braked by first closing the throttle valve and increasing electrical generation torque of a motor/generator while engine fuel injection is continued. When the rotation of the engine output shaft stops or reduces to a prescribed low speed, the engine fuel injection is stopped. In this technique, by controlling the output rotation with the aid of a differential allowance mechanism when the engine speed is reduced, the vehicle speed does not decrease in conjunction with the decrease in engine speed. The term "differential allowance mechanism" refers to a mechanism in which a torque generating element is connected to each rotating element of a planetary gear, such as in the configuration described in Japanese Laid-Open Patent Publication No. 2007-64097. This differential allowance mechanism has the function of allowing the engine speed to decrease while maintaining the output speed (i.e., the vehicle speed) by controlling the torque of each torque generating element. The term "differential allowance mechanism" as used in the present specification always has the same meaning, and does not, for example, include a planetary gear (differential mechanism) provided in a stepped automatic shifter.

SUMMARY

Hybrid systems exist for vehicles in which an engine, a motor/generator, and one or more drive wheels are connected in series via two clutches (this hybrid system is referred to below as a "series-connected drive system without a differential allowance mechanism"). In this series-connected drive system without a differential allowance mechanism, when the engine output shaft is braked (loaded) by the motor/generator, the vehicle speed decreases synchronously with the decrease in engine speed. This system therefore has the same drawback as the conventional technique described above, in that the output shaft of the engine cannot be braked by the motor/generator when the engine is stopped.

In view of the state of the known technology, one aspect of the present disclosure is to provide a hybrid vehicle control device capable of simultaneously achieving the objects of maintaining the efficiency of exhaust purification during engine restart, suppressing reduction of vehicle speed, and enhancing fuel efficiency during engine stop control in a series-connected drive system without a differential allowance mechanism.

In the hybrid vehicle control device described in the present disclosure, the hybrid vehicle control device mainly comprises an engine stop control section and a fuel injection control section. The engine stop control section is configured to issue an engine speed reduction command to reduce an engine speed of an engine during an engine stopping operation occurring in response to establishment of an engine stop condition by using an electric motor and slip engaging a drive-wheel side clutch disposed between the electric motor and a drive wheel such that the drive-wheel side clutch transmits rotational torque between the electric motor and the drive wheel. The fuel injection control section is configured to issue a fuel injection command to continue fuel injection during the engine stopping operation until the engine speed decreases below a prescribed engine speed whereupon the fuel injection is stopped.

BRIEF DESCRIPTION OF THE DRAWINGS

Referring now to the attached drawings which form a part of this original disclosure.

DETAILED DESCRIPTION OF EMBODIMENTS

Selected embodiments of a hybrid vehicle control device will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
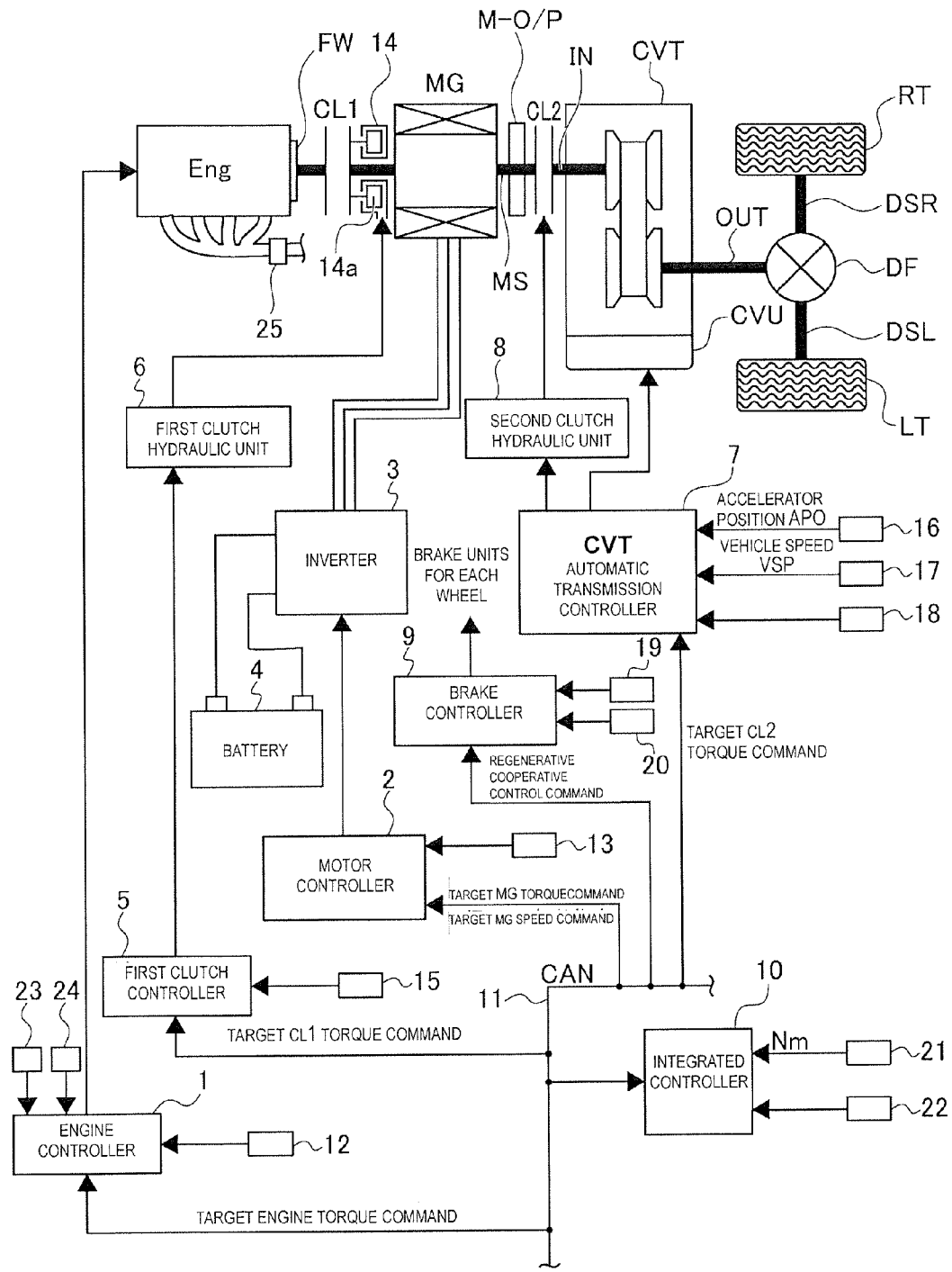
FIG. 1 is an overall schematic block diagram of a front wheel drive or rear wheel drive hybrid vehicle equipped with a hybrid vehicle control device in accordance with one illustrated embodiment.

Referring initially to FIG. 1, a hybrid vehicle drive system of a hybrid vehicle is illustrated that is equipped with a hybrid vehicle control device in accordance with an illustrated embodiment. In this example, the hybrid vehicle can be either a front wheel drive hybrid vehicle or a rear wheel drive hybrid vehicle. FIG. 1 is an overall schematic block diagram showing the hybrid vehicle drive system of the hybrid vehicle. As shown in FIG. 1, the drive train of the hybrid vehicle in the illustrated embodiment includes an internal combustion engine Eng, a flywheel FW, a first or engine-side clutch CL1, a motor/generator MG (motor), a mechanical oil pump M-O/P, a second or drive-wheel side clutch CL2, an automatic transmission CVT, a transmission input shaft IN, a transmission output shaft OUT, a differential DF, a left drive shaft DSL, a right drive shaft DSR, a left tire LT (drive wheel), and a right tire RT (drive wheel).

As shown in FIG. 1, the hybrid vehicle control device of the hybrid vehicle includes an engine controller 1, a motor controller 2, an inverter 3, a battery 4, a first clutch controller 5, a first clutch hydraulic unit 6, an AT (automatic transmission) controller 7, a second clutch hydraulic unit 8, a brake controller 9 and an integrated controller 10. The engine controller 1, the motor controller 2, the first clutch controller 5, the CVT controller 7, the brake controller 9, and the integrated controller 10 are connected to one another with a CAN communication line 11 such that they can communicate with one another to exchange information with each other.

The engine controller 1 issues engine control commands to the engine Eng. The engine controller 1 includes control programs and/or hardware for executing engine start control, engine stop control, throttle valve opening degree control, fuel cutoff control, and other control. The engine Eng is a gasoline engine or diesel engine. The engine Eng has a phase-variation-type variable valve timing mechanism (hereinafter referred to as VTC (variable timing control)). The engine controller 1 controls intake valve advancement/delay of the VTC, as well as ignition timing advancement/delay. The flywheel FW is provided to an engine output shaft.

The first clutch CL1 is a holding element that is arranged between the engine Eng and the motor/generator MG. The first clutch CL1 is hydraulically controlled based a first clutch control command from the first clutch controller 5 as discussed in more detail below using hydraulic pressure produced by the first clutch hydraulic unit 6. The first clutch CL1 is configured and arranged to be controlled to one of an engaged state, a released or disengaged state, and a semi-engaged or slip engagement state (a partially engaged state in which slipping occurs). In the illustrated embodiment, the first clutch CL1 is a dry single-plate clutch that is configured such that a clutch piston stroke and a torque transfer capacity (engagement torque capacity) thereof can be controlled in a continuously variable fashion by controlling a flow rate and pressure of a control oil. The first clutch CL1 is configured to be normally closed, i.e., such that it is fully engaged due to the force of a return spring (e.g., diaphragm spring) when the flow rate and hydraulic pressure of the control oil are both zero. For example, the engagement state is controlled by throttle control using a hydraulic actuator 14 having a piston 14a is used as the first clutch CL1. In particular, in the illustrated embodiment, the first clutch controller 5 issues the first clutch control command to the first clutch hydraulic unit 6 for controlling a first clutch control oil pressure of the first clutch hydraulic unit 6.

The motor/generator MG is, for example, a conventional synchronous motor/generator having a rotor provided with embedded permanent magnets and a stator with a stator coil wound there-about. The motor/generator MG is controlled by controlling a three-phase alternating current that is produced by the inverter 3 based on a control command issued from the motor controller 2 (described later) and applied to the motor/generator MG. The motor/generator MG is configured and arranged to operate as an electric motor by receiving electric power from the battery 4 and outputting a rotary drive force or torque (i.e., this operating state is called a power running mode). The motor/generator MG is also configured and arranged to operate as an electric generator that recharges the battery 4 when the rotor is rotated by an external force (e.g., the engine Eng or drive wheels) such that an electromotive force is produced at both ends of the stator coil (i.e., this operating state is called a regeneration mode). The rotor of the motor/generator MG is connected to an input shaft of the automatic transmission AT through a damper (not shown).

The mechanical oil pump M-O/P is mechanically coupled to a motor shaft MS of the motor/generator MG. The mechanical oil pump M-O/P is driven by the motor/generator MG. The mechanical oil pump M-O/P acts as an oil pressure source for a hydraulic control valve unit CVU, which is attached to the automatic transmission CVT. mechanical oil pump M-O/P acts as an oil pressure source for the first clutch hydraulic unit 6 and the second clutch hydraulic unit 8. The first clutch hydraulic unit 6 and the second clutch hydraulic unit 8 are housed in the automatic transmission CVT. An electric oil pump driven by an electric motor can also be provided for those instances in which the discharge pressure from the mechanical oil pump M-O/P is inadequate or cannot be anticipated.

The second clutch CL2 is a holding element that is arranged between the motor shaft MS and the transmission input shaft IN. The second clutch CL2 is disposed in the space between the motor/generator MG and the left and right wheels LT and RT. The second clutch CL2 is hydraulically controlled based a control command from the CVT controller 7, as discussed in more detail below, using hydraulic pressure produced by the second clutch hydraulic unit 8. The second clutch CL2 is a wet multi-plate clutch configured such that the torque transfer capacity of the second clutch CL2 can be controlled in a continuously variable fashion by controlling the flow rate and pressure of a hydraulic oil with, for example, a proportional solenoid. The second clutch CL2 is configured and arranged to be controlled to one of an engaged state, a released or disengaged state, and a semi-engaged or slip engagement state (a partially engaged state in which slipping occurs).

The automatic transmission CVT is disposed downstream from the second clutch CL2. The automatic transmission CVT can be a belt-type continuously variable transmission. The automatic transmission CVT automatically changing the gear ratio in stepless fashion. Thus, the automatic transmission AT is configured and arranged to shift automatically to change the gear ratio based on such factors as the vehicle speed, the throttle opening, the accelerator position, or the like. In other words, a target input speed of the automatic transmission CVT is established according to the vehicle speed, the throttle opening, the accelerator position, and other factors. The automatic transmission CVT primarily includes a primary pulley on the transmission input shaft IN, a secondary pulley on the transmission output shaft OUT, and a belt that is mounted on the pulleys. A primary pulley pressure and a secondary pulley pressure are created based on the pump oil pressure, and the gear ratio is steplessly varied by moving a movable pulley of the primary pulley and a movable pulley of the secondary pulley with the aid of the pulley pressures, and varying the radius of contact between the belt and the pulleys.

The transmission output shaft OUT of the automatic transmission CVT to the differential DF and a final drive mechanism not shown in the drawing. The left and right wheels LT and RT are operatively coupled to the differential DF via the left drive shaft DSL and the right drive shaft DSR, respectively. In the illustrated embodiment, as mentioned above, the first and second clutches CL1 and CL2 include, for example, conventional multi-plate wet clutches for which the flow rate and pressure of the hydraulic fluid can be controlled with proportional solenoids.

In this embodiment, the hybrid drive train has three drive modes (first, second, and third drive modes) that are set in accordance with the engagement state (engaged or released) of the first clutch CL1. The first drive mode is an electric vehicle drive mode (hereinafter referred to "EV mode"). The EV mode is a mode in which the first clutch CL1 is released and the motor/generator MG is used as the power or drive source such that the vehicle is driven using only power from the motor/generator MG. In the EV mode, drive is accomplished through any motor drive mode and/or regeneration drive mode. The EV mode is normally selected when the need for drive power is low and the battery SOC is available. The second drive mode is a hybrid vehicle drive mode (hereinafter referred to "HEY mode"). The HEV mode is a mode in which the first clutch CL1 is engaged and the engine Eng and the motor/generator MG are used together as drive sources. In the HEV mode, drive is accomplished through any of a motor assist drive mode, an electrical generation drive mode, and an engine drive mode. The HEV mode is selected when the need for drive power is high, or when the battery SOC is inadequate. When the drive train transitions from the EV mode to the HEV mode, the first clutch CL1 is engaged and torque from the motor/generator MG is used to start the engine Eng. The third drive mode is a drive torque control drive mode (hereinafter referred to "WSC (wet start clutch) mode"). The WSC mode is a mode in which the first clutch CL1 is engaged and the second clutch CL2 is maintained in a slipping engaged state by controlling the speed of the motor/generator MG and controlling the clutch oil pressure. In the WSC mode, the vehicle is driven using the engine Eng as a power source in addition to the motor/generator MG. In the WSC mode, drive is accomplished by controlling the clutch torque capacity, which is the required drive torque determined according to the vehicle state or a driver operation, so that the clutch transmission torque passing through the second clutch CL2. The WSC mode is selected in drive ranges in which the engine speed falls below the idle speed, or in an acceleration-from-stop range in which the oil discharged by the pump is inadequate, such as when the vehicle is stopped, accelerating from a stop, or decelerating in the state in which HEV mode is selected.

The engine controller 1 receives engine speed information from an engine speed sensor 12, a target engine torque command from the integrated controller 10, and other necessary information. Basically, the engine controller 1 receives engine rotational speed information from the engine rotational speed sensor 12. The engine controller 1 also feeds information regarding the engine rotational speed Ne to the integrated controller 10 through the CAN communication line 11. Based on a target engine torque command from the integrated controller 10, the engine controller 1 issues a command to control an engine operating point (engine rotational speed Ne and engine output torque Te) by adjusting, for example, a throttle valve actuator (not shown). Detection signals from an airflow meter 23 are inputted to the engine controller 1. The airflow meter 23 detects the intake air volume of the engine Eng. Detection signals from an $O_2$ sensor 24 are inputted to the engine controller 1. The $O_2$ sensor 24 detects the exhaust gas/fuel ratio in the exhaust gas. When the HEV mode is selected, the engine controller 1 sets the ignition timing of the engine Eng to $X°$ BTDC (X>0). The engine controller 1 also sets the fuel injection volume of the engine Eng on the basis of the engine speed and the intake air volume. The engine controller 1 also executes control ($\lambda$ control) for varying the fuel injection compensation value $\lambda$ on the basis of the detection value of the $O_2$ sensor 24 so that the catalyst atmosphere of the three-way catalytic converter 25 is maintained substantially at a theoretical air/fuel ratio.

The motor controller 2 receives information from a resolver 13 that detects a rotational position of the rotor of the motor/generator MG. The integrated controller 10 outputs a target MG torque command and a target MG speed command, as well as other necessary information to the motor controller 2. Based on the target MG torque command from the integrated controller 10, the motor controller 2 issues a command to control an operating point or position of the motor/generator MG (motor rotational speed Nm and motor output torque Tm) to the inverter 3. The basic control performed by the motor controller 2 is torque control for setting the motor torque to a target torque and causing the speed thereof to match the rotation of the drive system. However, during slip control of the second clutch CL2 and other control, the motor controller 2 controls speed so that the motor speed matches the target speed and the torque conforms to the load of the drive system. The motor controller 2 also monitors the battery SOC (state of charge) of the battery 4. The battery SOC indicates the charging capacity of the battery 4. In addition to using the battery SOC information as control information for the motor/generator MG, the motor controller 2 feeds the battery SOC information to the integrated controller 10 through the CAN communication line 11.

The first clutch controller 5 receives sensor information from a first clutch stroke sensor 15 that detects the stroke position of a piston 14a of the hydraulic actuator 14. The first clutch controller 5 also receives a target CL1 torque command from the integrated controller 10, and other necessary information. Based on a first clutch control command (e.g., the target CL1 torque command) from the integrated controller 10, the first clutch controller 5 issues a command to control connection and release of the first clutch CL1 to the first clutch hydraulic unit 6. The command from the first clutch controller 5 can selectively engage, slip engage and release the first clutch CL1 as needed by outputting the command to the first clutch hydraulic unit 6, which is located inside a hydraulic control valve unit CVU. The first clutch controller 5 also outputs information regarding the stroke position of a piston 14a of the hydraulic actuator 14 to the integrated controller 10 through the CAN communication line 11.

The CVT controller 7 receives sensor information from an accelerator position sensor 16, a vehicle speed sensor 17 and a second clutch hydraulic pressure sensor 18, as well as other data and/or signals. The CVT controller 7 sends the sensor information indicating the accelerator position APO, and the vehicle speed VSP to the integrated controller 10 through the CAN communication line 11. During travel when a D range is selected to engage the automatic transmission CVT, a target input speed is obtained by the CVT controller 7 from a shift map based on the accelerator position APO and the vehicle speed VSP. A control command is outputted from the CVT controller 7 to the hydraulic control valve unit CVU for obtaining the retrieved target input speed (gear ratio).

In addition to this gear shifting control, when a target CL2 torque command is inputted from the integrated controller 10 to the CVT controller 7, a second clutch control of the second clutch CL2 is executed by the CVT controller 7 to control the clutch oil pressure of the second clutch hydraulic unit 8 inside the hydraulic control valve unit CVU. In other words, based on a second clutch control command from the integrated controller 10, the CVT controller 7 issues a command to the second clutch hydraulic unit 8 to selectively control connection, slip engagement and release of the second clutch CL2 as needed. In engine start control, engine stop control, and other engine control, when a gear shifting control command is outputted from the integrated controller 10, normal gear shifting control is given priority, and gear shifting control is performed in accordance with the gear shifting control command.

The brake controller 9 receives sensor information from a wheel speed sensor 19 that detects a wheel speed of each of the four wheels and from a brake stroke sensor 20. The brake controller 9 also receives a regenerative cooperative control command from the integrated controller 10, and other necessary information. For example, if a brake pedal is depressed and a requested braking force determined based on a brake stroke BS cannot be achieved with a regenerative braking force alone, then the brake controller 9 executes a regenerative cooperative brake control based on a regenerative cooperative brake control command from the integrated controller 10 so as to supplement the regenerative braking force with a mechanical braking force (i.e., a braking force produced by a frictional brake, hydraulic braking force, or motor braking force).

The integrated controller 10 serves the functions of managing the energy consumption of the vehicle as a whole and running the vehicle at the highest possible efficiency. The integrated controller 10 also receives information from a motor rotational speed sensor 21 as well as from other sensors and switches 22. The integrated controller receives this information and other information through the CAN communication line 11. The motor speed sensor 21 detects the motor rotational speed Nm of the motor/generator MG. The integrated controller 10 also outputs a target engine torque command to the engine controller 1, a target MG torque command and a target MG speed command to the motor controller 2, a target CL1 torque command to the first clutch controller 5, a target CL2 torque command to the CVT controller 7, and a regenerative cooperative control command to the brake controller 9.

The integrated controller 10 executes an operation control of the engine Eng by sending an engine control command to the engine controller 1. The integrated controller 10 also executes an operation control of the motor/generator MG by sending a motor control command to the motor controller 2. The integrated controller 10 further executes engagement and release control of the first clutch CL1 by sending or issuing a control command to the first clutch controller 5, and executes engagement and release control of the second clutch CL2 by sending a control command to the CVT controller 7. The integrated controller 10 preferably includes a microcomputer with control programs that controls the engine Eng, the motor/generator MG, the first clutch CL1, the second clutch CL2 and other various components of the hybrid vehicle as discussed below. The integrated controller 10 can also include other conventional components such as an input interface circuit, an output interface circuit, and storage devices such as a ROM (Read Only Memory) device and a RAM (Random Access Memory) device. The microcomputer of the integrated controller 10 is programmed to control the engine Eng, the motor/generator MG, the first clutch CL1, the second clutch CL2 and other various components. The integrated controller 10 is operatively coupled to the engine controller 1, the motor controller 2, the first clutch controller 5, and the CVT controller 7 in a conventional manner. The internal RAM of the integrated controller 10 stores statuses of operational flags and various control data. The internal ROM of the integrated controller 10 stores various data for various operations. The integrated controller 10 is capable of selectively controlling any of the components of the control system in accordance with the control program. It will be apparent to those skilled in the art from this disclosure that the precise structure and algorithms for the integrated controller 10 can be any combination of hardware and software that will carry out the functions discussed herein.

Figure 2:
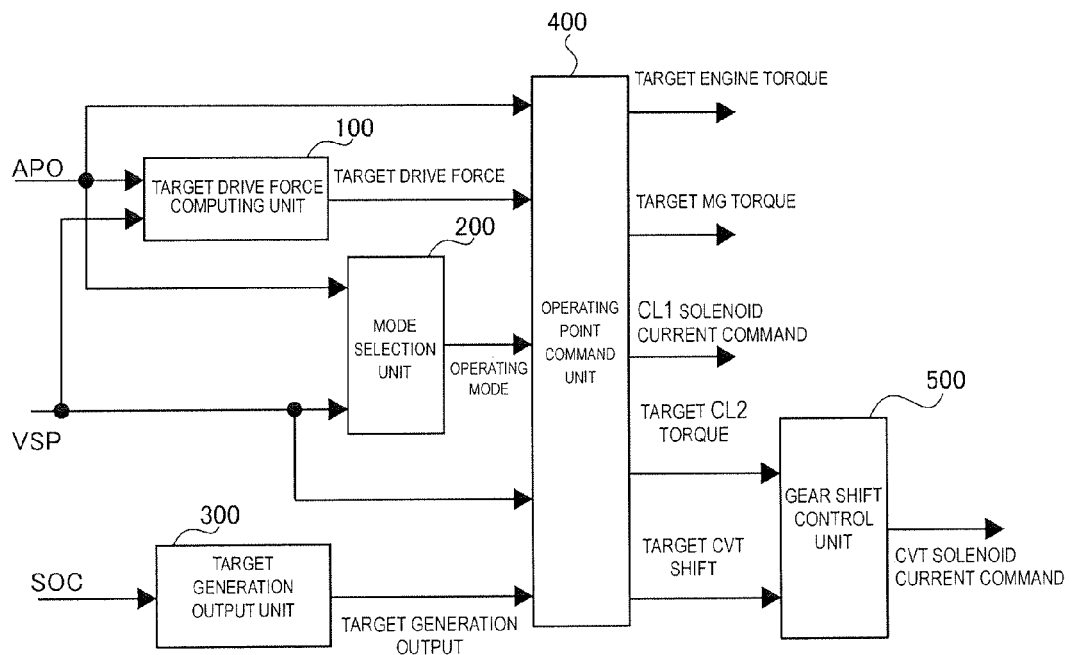
FIG. 2 is a control block diagram illustrating the computer programming (computational processing) executed by an integrated controller of the hybrid vehicle control device of the illustrated embodiment.
Figure 3:
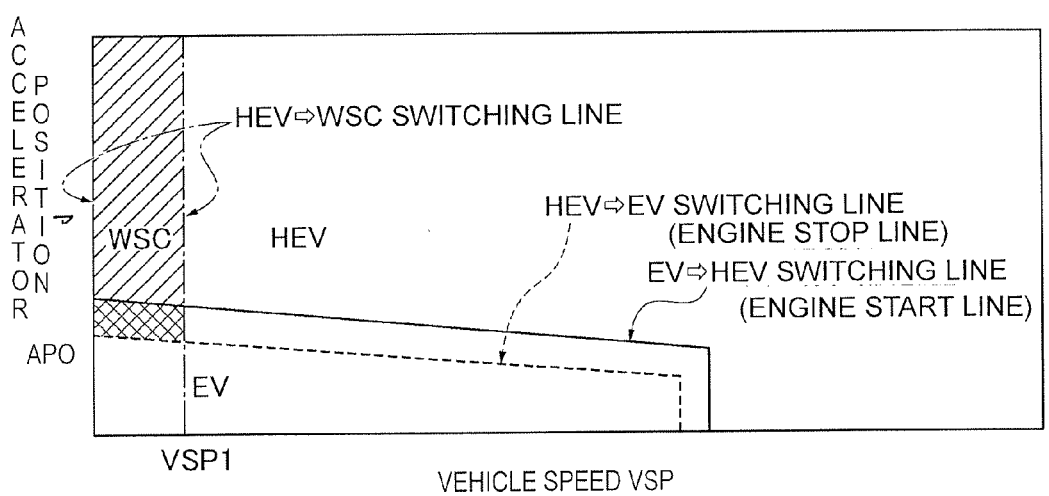
FIG. 3 is a view showing an example of the EV-HEV selection map set by the mode selection unit of the integrated controller of the illustrated embodiment.

FIG. 2 is a block diagram showing the computational processing performed by the integrated controller 10 of the first embodiment. FIG. 3 is a view showing an example of the map set in the mode selection unit 200 of the integrated controller 10. The computational processing performed by the integrated controller 10 will be described using FIGS. 2 and 3.

As shown in FIG. 2, the integrated controller 10 is provided with a target drive force computing unit 100, a mode selection unit 200, a target generation output unit 300, an operating point command unit 400 and a gear shift control unit 500.

The target drive force computing unit 100 calculates a target steady-state drive torque and an MG assist torque from the accelerator position APO and the vehicle speed VSP using a target steady-state drive torque map and an MG assist torque map.

The mode selection unit 200 computes a target drive mode (HEV mode, EV mode, WSC mode) from the accelerator position APO and the vehicle speed VSP using the EV-HEV selection map shown in FIG. 3. The EV-HEV selection map sets an EV⇒HEV switching line (engine start line) for switching to the "HEV mode" when the operating points (APO, VSP) in the EV region cross, an HEV⇒EV switching line (engine stop line) for switching to the "EV mode" when the operating points (APO, VSP) in the HEV region cross, and an HEV⇒WSC switching line for switching to the "WSC mode" when the operating points (APO, VSP) enter the WSC region when the "HEV mode" is selected. The HEV⇒EV switching line and the HEV⇒EV switching line are set having a hysteresis amount as lines for dividing the EV region and the HEV region. The HEV⇒WSC switching line is set along a first set vehicle speed VSP1 at which the engine Eng maintains idle speed when the automatic transmission CVT is in first gear or the lowest gear ratio. However, when the "EV mode" is selected, the "HEV mode" is forced as the target drive mode when the battery SOC has decreased to or below a prescribed value.

The target generation output unit 300 computes a target generation output from the battery SOC using an in-travel generation required output map. The target generation output unit 300 also computes the output that is necessary to increase the engine torque from the current engine operating point (speed, torque) to the optimum fuel efficiency line. The target generation output unit 300 then compares the result of the computed output with the target generation output, and adds the lesser of the compared outputs to the engine output as the required output.

The operating point command unit 400 computes a transitional target engine torque, a target MG torque, a target CL2 torque capacity, a target gear ratio (target CVT shift), and a CL1 solenoid current command from the accelerator position APO, the target steady-state torque, the MG assist torque, the target drive mode, the vehicle speed VSP, and the required generation output using these parameters as operating point targets.

The gear shift control unit 500 computes a CVT solenoid current command for controlling the driving of the solenoid valve inside the automatic transmission CVT from the target CL2 torque capacity and the target gear ratio (target CVT shift) so that these targets are reached.

Figure 4:
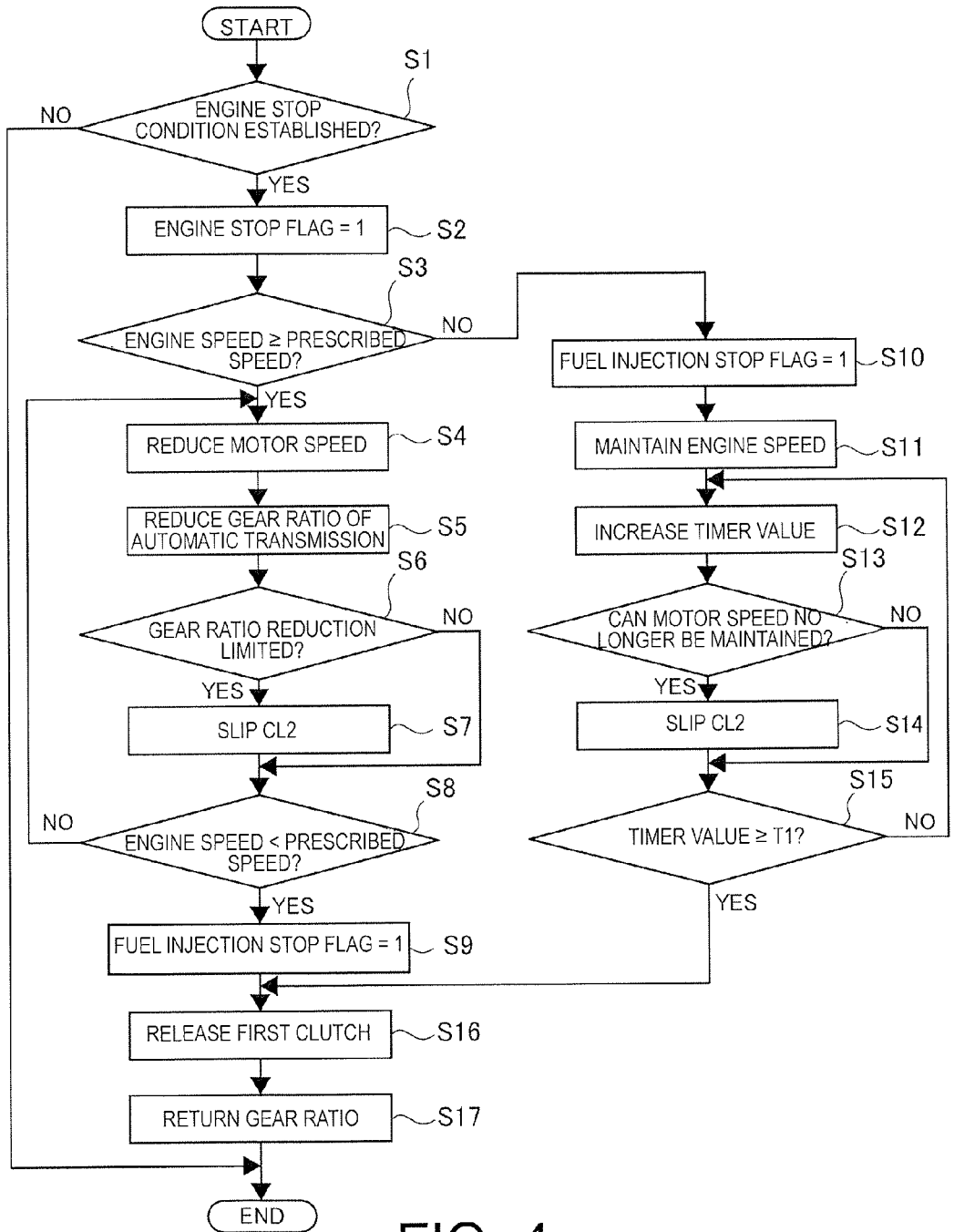
FIG. 4 is a flowchart of an engine stop control processing executed by the integrated controller of the hybrid vehicle control device of the illustrated embodiment whereby the engine is stopped in accordance with establishment of a prescribed engine stop condition.
Figure 5:
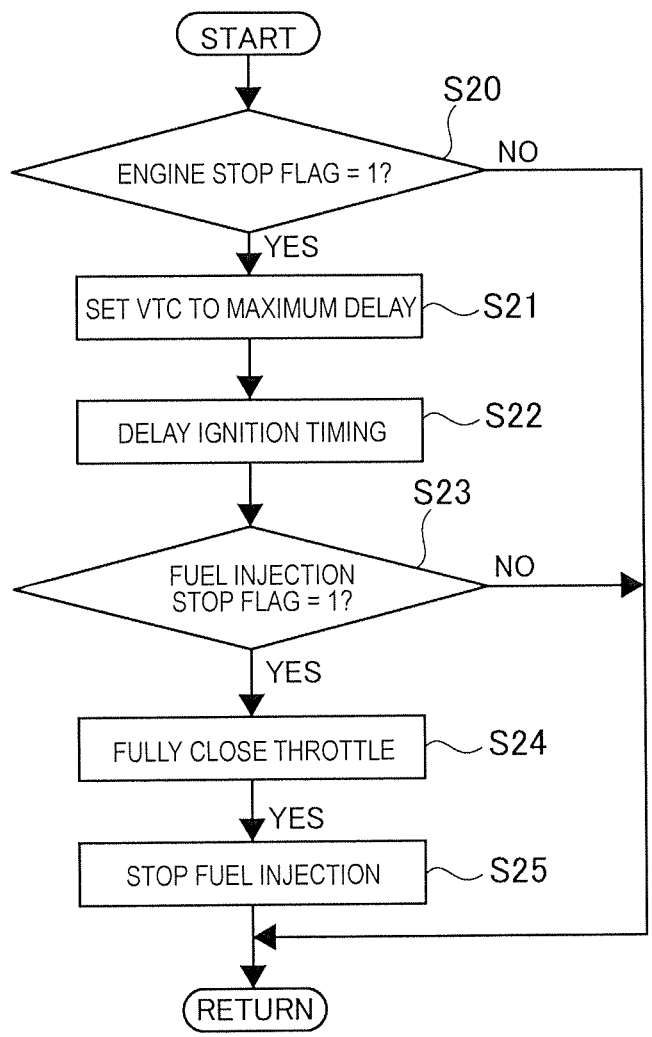
FIG. 5 is a flowchart of an engine stop control processing executed by the engine controller in the illustrated embodiment, whereby the engine is stopped when an engine stop flag and a fuel injection stop flag are inputted.

The engine stop control processing of FIGS. 4 and 5 that are executed by the integrated controller 10 and the engine controller 1 in conjunction with the motor controller 2, the first clutch controller 5 and the CVT controller 7 constitute an engine stop control section and a fuel injection control section. Basically, as explained below, the engine stop control section issues an engine speed reduction command to reduce an engine speed of the engine Eng during an engine stopping operation occurring in response to establishment of an engine stop condition by using the motor MG and engaging the second or drive-wheel side clutch CL2, which is disposed between the motor MG and at least one of the drive wheels LT and RT such that the second or drive-wheel side clutch CL2 transmits rotational torque between the motor MG and at least one of the drive wheels LT and RT. The fuel injection control section issues a fuel injection command to continue fuel injection during the engine stopping operation until the engine speed decreases below a prescribed engine speed whereupon the fuel injection is stopped.

Thus, in the hybrid vehicle control device, as described below, when the engine speed is reduced while fuel injection is continued during engine stop control, the drive system is such that the engine Eng is coupled to one side of the motor MG via the first clutch CL1 in an engaged state, and the drive wheels LT and RT are coupled to the other side of the motor MG via the second clutch CL2 in a slipping engaged state. Therefore, although the drive system is one that does not have a differential allowance mechanism in which the engine Eng, the motor MG and the drive wheels LT and RT are connected in series, the change in speed is equal between the engine Eng and the motor Mg, and a relationship of differential rotation is maintained between the engine Eng, the motor MG and the drive wheels LT and RT such that a difference in rotation is allowed between the motor MG and the drive wheels LT and RT by the slipping engagement of the second clutch CL2. Consequently, since combustion gas is sent to the three-way catalytic converter 25 of the exhaust system until immediately prior to actual stoppage of the engine Eng when the engine Eng is stopped, the efficiency of exhaust purification can be maintained during restarting of the engine Eng. The speed of the drive wheels (vehicle speed) can also be prevented from decreasing by the rotation difference absorbing effect created by the slipping of the second clutch CL2, regardless of any reduction in the speed of the motor MG. Furthermore, the engine speed can be rapidly reduced by co-rotation through the speed reduction of the motor MG, which has highly responsive control, and fuel efficiency is enhanced by reducing the amount of time taken to stop fuel injection. As a result, exhaust purification efficiency can be maintained during engine restart, reduction of vehicle speed can be suppressed, and fuel efficiency can be enhanced simultaneously during engine stop control in a series-connected drive system that does not have a differential allowance mechanism.

FIG. 4 is a flowchart showing the flow of engine stop control processing executed by the integrated controller 10 in the first embodiment to stop the engine Eng according to the establishment of an engine stop condition. The steps of FIG. 4 are described below.

In step S1, a determination is made by the integrated controller 10 as to whether a stop condition for the engine Eng exists. When the determination is "YES" (Eng stop condition exists (e.g., established), the process of the integrated controller 10 proceeds to step S2. When the determination is "NO" (Eng stop condition not established), the process proceeds to "END." For example, during travel in the selected "HEV mode," when a determination is made that the charging capacity (battery SOC) of the battery 4 is low, the required drive power indicated by the accelerator position APO is low, and travel by the motor/generator MG alone is possible without relying on the power of the engine Eng, a mode transition command for a transition from "HEV mode" to "EV mode" is issued (see FIG. 3), but a stop condition for the engine Eng is established by the outputting of an engine stop requirement based on the mode transition command.

In step S2, following the determination in step S1 that an Eng stop condition is established or exists, an engine stop flag is set to 1 for allowing an engine stop operation to occur. Then, the process proceeds to step S3.

In step S3, following the setting of the engine stop flag to 1 in step S2, a determination is made as to whether the engine speed N1 at the time that engine stop control was initiated is equal to or greater than a prescribed engine speed N2 this is equal to the speed at which fuel cutoff control is initiated, and when the determination is YES (engine speed N1≧prescribed engine speed N2), the process proceeds to step S4; when the determination is NO (engine speed N1<prescribed engine speed N2), the process proceeds to step S10.

In step S4, following the determination that engine speed N1≧prescribed engine speed N2 in step S3 or step S8, the motor speed created by the motor/generator MG is reduced while the first clutch CL1 remains in the fully engaged state, and the process proceeds to step S5.

In step S5, following the reduction of the motor speed in step S4, the gear ratio of the automatic transmission CVT is gradually reduced (shifting to a higher gear) so that the decrease in motor speed is not accompanied by a decrease in the vehicle speed that is equal to the transmission output speed, and the process proceeds to step S6.

In step S6, following the reduction in the gear ratio of the automatic transmission CVT in step S5, a determination is made as to whether a limit (higher-gear shifting limit or higher-gear shifting speed limit) has been reached in reducing the gear ratio (shifting to a higher gear) of the automatic transmission CVT in conjunction with reducing the motor speed. When the determination is "YES" (a limit to gear ratio reduction has been reached), the process proceeds to step S7. When the determination is "NO" (a limit to gear ratio reduction has not been reached), the process proceeds to step S8.

In step S7, following the determination in step S6 that a limit to gear ratio reduction has been reached, the second clutch CL2 is placed in a slipping engaged state, and the process proceeds to step S8.

In step S8, following the determination in step S6 that a limit to gear ratio reduction has not been reached, or following slipping engagement of the CL2 in step S7, a determination is made as to whether the engine speed N1 is less than the prescribed engine speed N2. When the determination is "YES" (the engine speed N1<the prescribed engine speed N2), the process proceeds to step S9. When the determination is "NO" (the engine speed N1≧the prescribed engine speed N2), the process returns to step S4.

In step S9, following the determination in step S8 that the engine speed N1<the prescribed engine speed N2, a fuel injection stop flag is set to 1 for allowing the stopping of fuel injection to occur, and the process proceeds to step S16.

In step S10, following the determination in step S3 that the engine speed N1<the prescribed engine speed N2, the fuel injection stop flag for allowing the stopping of fuel injection is set to 1, and the process proceeds to step S11.

In step S11, following the setting of the fuel injection stop flag to 1 in step S10, the engine speed N1 then in effect is maintained, and the process proceeds to step S12.

In step S12, following the maintaining of the engine speed N1 in step S11, or a determination in step S15 that the timer value<T1, a timer value indicating the amount of time that the engine speed has been maintained is increased. Then, the process proceeds to step S13. The set time T1 for the timer value in this case is set equal to the time required for the speed of the engine Eng to decrease to the engine speed N1 when fuel injection is stopped at the prescribed engine speed N2 from a state in which the engine Eng alone is rotating independently.

In step S13, following the increasing of the timer value in step S12, a determination is made as to whether the rotation of the motor cannot be maintained due to such causes as inability to maintain the primary pulley speed of the automatic transmission CVT. When the determination is "YES" (motor rotation cannot be maintained), the process proceeds to step S14. When the determination is "NO" (motor rotation can be maintained), the process proceeds to step S15.

In step S14, following the determination in step S13 that motor rotation cannot be maintained, the second clutch CL2 is placed in the slipping engaged state, and the process proceeds to step S15.

In step S15, following the determination in step S13 that motor rotation can be maintained, or following slipping engagement of the second clutch CL2 in step S14, a determination is made as to whether the timer value is equal to or greater than the set time T1. When the determination is "YES" (timer value≧T1), the process proceeds to step S16. When the determination is "NO" (timer value<T1), the process returns to step S12.

In step S16, following the setting of the fuel injection stop flag to 1 in step S9, or following a determination in step S15 that timer value≧T1, the first clutch CL1 linking the engine Eng and the motor/generator MG is released, the engine Eng is cut off from the motor/generator MG, and the process proceeds to step S17.

In step S17, following the release of the first clutch CL1 in step S16, the gear ratio of the automatic transmission CVT is returned to the gear ratio that was in effect when this engine stop control was initiated. Also the speed of the motor/generator MG also correspondingly returns to the motor speed that was in effect when engine stop control was initiated. Then, the process proceeds to END.

FIG. 5 is a flowchart showing the flow of the engine stop control processing (engine stop control section) executed by the engine controller 1 in the first embodiment to stop the engine Eng when an engine stop flag and a fuel injection stop flag are inputted. The steps of FIG. 5 are described below.

In step S20, a determination is made by the engine controller 1 as to whether an engine stop flag inputted from the integrated controller 10 is equal to 1. When the determination is "YES" (engine stop flag=1), the process proceeds to step S21. When the determination is "NO" (engine stop flag=0), the process proceeds to RETURN.

In step S21, following a determination in step S20 that engine stop flag=1, the valve timing of the intake valve of the engine Eng is set to the maximum delay and returned to the valve timing that was in effect when the engine was started, and the process proceeds to step S22.

In step S22, following the setting of the VTC to maximum delay in step S21, the ignition timing of the engine Eng is delayed, the ignition timing is set to Y° BTDC (Y<0), and the process proceeds to step S23. The engine torque and the engine speed can be reduced by delaying the ignition timing in this manner. The ignition timing Y° BTDC is set so as to be delayed as long as possible in a range in which the stability of combustion in the engine Eng is not adversely affected.

In step S23, following the delaying of the ignition timing in step S22, a determination is made as to whether a fuel injection stop flag inputted from the integrated controller 10 is equal to 1. When the determination is "YES" (fuel injection stop flag=1), the process proceeds to step S24. When the determination is "NO" (fuel injection stop flag=0), the process proceeds to RETURN.

In step S24, following a determination in step S23 that fuel injection stop flag=1, an electronic throttle valve of the engine Eng is placed in the fully closed position, and the process proceeds to step S25. By thus fully closing the electronic throttle valve, the intake air volume of the engine Eng is reduced, and the engine torque and engine speed are further reduced.

In step S25, following full closure of the throttle in step S24, fuel injection to the engine Eng is stopped to stop the engine Eng, and the process proceeds to RETURN. When a large required drive power occurs and a transition to the "EV mode" is cancelled during the engine stop control described above, engine stop control is cancelled, and the gear ratio of the automatic transmission CVT is returned to the original state thereof. The engine stop flag, fuel injection stop flag, and other flags are then returned to the initial values (0) thereof.

The operation of the present example will next be described. The description of the operation of the hybrid vehicle control device according to the first embodiment will be divided into descriptions of the "operation of maintaining exhaust purification efficiency during engine restart," the "operation of engine stop control when N1≧N2," and the "operation of engine stop control when N1<N2."

Operation of maintaining exhaust purification efficiency during engine restart will now be discussed. As mentioned above, the three-way catalytic converter 25 is provided in the engine exhaust path for purifying exhaust gas. This three-way catalytic converter 25 includes a catalyst for simultaneously purifying emissions (HC, CO, $NO_x$) in the exhaust gas, and maintaining the catalyst atmosphere at a theoretical air/fuel ratio in order to maximize the efficiency of purification. Therefore, in engine control, the air/fuel ratio of the engine Eng is alternated between a rich state and a lean state so that the catalyst atmosphere is kept at a theoretical air/fuel ratio. However, during engine stop control, when control is executed for stopping the engine Eng by immediately stopping fuel injection when an engine stop condition is established, air (oxygen) only flows into the three-way catalytic converter 25 during the time taken for engine rotation to stop after fuel injection is stopped. This situation will cause the catalyst atmosphere to enter the lean state. Since the amount of oxygen stored by the three-way catalytic converter 25 increases when the catalyst atmosphere is in the lean state, the ability of the three-way catalytic converter 25 to purify $NO_x$ decreases during engine restart, causing the amount of $NO_x$ discharged into the air to increase.

In the engine stop control of the first embodiment, however, the engine stop flag is set (step S2) when an engine stop condition is established (YES in step S1). When the engine stop flag is set, the following sequence from the flowchart in FIG. 5 is repeated: step S20→step S21→step S22→step S23→RETURN. In other words, in step S21, the valve timing of the intake valve of the engine Eng is set to maximum delay, and the valve timing that was in effect when the engine Eng was started is returned to, and in step S22, the ignition timing of the engine Eng is delayed.

After the engine stop flag is set, when the engine speed N1 exceeds the prescribed engine speed N2 (YES in step S3), the process waits until the condition in which the engine speed N1 is less than the prescribed engine speed N2 is established (YES in step S8) before setting the fuel injection stop flag (step S9) and releasing the first clutch CL1 (step S16). After the fuel injection stop flag is set, the following sequence from the flowchart of FIG. 5 is repeated from step S23: step S24→step S25→RETURN. In other words, in step S24, the electronic throttle valve of the engine Eng is placed in the fully closed position, and in step S25, fuel injection to the engine Eng is stopped and the engine Eng is stopped.

In the engine stop control thus configured, even when an engine stop condition is established, by merely readying a system of preparing for engine restart, it is possible to wait until the engine speed N1 decreases to the prescribed engine speed N2 while fuel injection to the engine Eng continues, and when the engine speed has decreased to the prescribed engine speed N2, the engine Eng is stopped by closing the electronic throttle valve to stop fuel injection.

Consequently, since fuel injection is continued until immediately before the engine Eng is stopped, and combustion gas is sent to the three-way catalytic converter 25, it is possible to prevent a lean state of the catalyst atmosphere in which only air (oxygen) flows into the three-way catalytic converter 25, and to prevent adverse effects on the ability to purify $NO_x$ during engine restarting. Since the electronic throttle valve is open between the time the fuel injection stop flag is set and the time of fuel cutoff in which fuel injection is stopped, and the electronic throttle valve is closed to coincide with fuel cutoff, no sudden boosts (negative pressures) occur, fuel adhering to the port walls of the intake manifold does not combine with the injected fuel and flow in to cause richness or peaking of the air/fuel ratio, and exhaust performance can be enhanced.

Next, operation of engine stop control that occurs when the engine speed N1≧the prescribed engine speed N2 will be discussed. When the engine speed N1 is equal to or higher than the prescribed engine speed N2, and there is no limit to gear ratio reduction (shifting to a higher gear) of the automatic transmission CVT when an engine stop condition is established, the process proceeds in the sequence step S1→step S2→step S3→step S4→step S5→step S6→step S8 in the flowchart of FIG. 4, and the sequence step S4→step S5→step S6→step S8 is repeated insofar as the determination is made in step S8 that N1≧N2. Specifically, in step S4, the motor speed created by the motor/generator MG is reduced while the first clutch CL1 remains in the fully engaged state, and in step S5, the gear ratio of the automatic transmission CVT is gradually reduced and shifted to the higher gear so that the decrease in motor speed is not accompanied by a decrease in vehicle speed, which is equal to the transmission output speed.

When a limit to gear ratio reduction (shifting to a higher gear) of the automatic transmission CVT is reached, the sequence step S4→step S5→step S6→step S7→step S8 is repeated insofar as the determination is made in step S8 that N1≧N2. Specifically, when a determination is made in step S6 that a limit to gear ratio reduction by the automatic transmission CVT has been reached, the second clutch CL2 is placed in the slipping engaged state in step S7. The engine speed N1 then decreases in response to the decrease in motor speed, and when the determination is made in step S8 that N1<N2, the following sequence occurs after step S8: step S9→step S16→step S17→END. Specifically, in step S9, the fuel injection stop flag is set, and in step S16, the first clutch CL1 linking the engine Eng and the motor/generator MG is released. In step S17, the gear ratio of the automatic transmission CVT is returned to the gear ratio that was in effect when engine stop control was initiated, and the speed of the motor/generator MG also correspondingly returns to the motor speed that was in effect when engine stop control was initiated.

In the first embodiment as described above, when the engine speed N1 at the time that engine stop control is initiated is equal to or greater than the prescribed engine speed N2 (YES in step S3) when an engine stop condition is established (YES in step S1), the motor speed is reduced (step S4), and the engine speed is also correspondingly reduced by co-rotation via the engaged first clutch CL1. The primary speed of the automatic transmission CVT also decreases by the same amount as the motor speed, but once a limit to shifting the gear ratio to a higher gear is reached to ensure return to the low side, or the speed of low gear shifting reaches a limit, and the primary speed can no longer be reduced (YES in step S6), the oil pressure of the second clutch CL2 is withdrawn, and the second clutch CL2 is allowed to slip (step S7). Then, when the engine speed is reduced using the motor/generator MG to the higher of the prescribed engine speed N2 and the lowest speed of the motor (YES in step S8), the first clutch CL1 is released once the engine speed has decreased (step S16), and rotation of the engine Eng is stopped (FIG. 5). Following is a description of the effects of enhanced fuel efficiency, suppressing reduction of vehicle speed, and resumption of travel/re-acceleration in engine stop control when N1≧N2.

The fuel efficiency enhancing effects of the engine stop control of the first embodiment will now be discussed. In the engine stop control of the first embodiment, the engine speed N1 is reduced to the prescribed engine speed N2 by the motor/generator MG during stopping of the engine Eng. For example, the effects of engine stop control when there is no limit of shifting to a higher gear of the automatic transmission CVT will be described using the time chart shown in FIG. 6. First, when the engine speed is to be reduced by setting the gear ratio of the automatic transmission CVT to a higher gear and reducing the transmission input speed, the engine speed characteristic indicated by the dash-dotted line decreases at a gradual slope from time t0, which corresponds to the engine speed N1 at the time the engine stop condition is established, and decreases to the prescribed engine speed N2 by time t3. In contrast, when the engine speed is reduced by motor control, the engine speed characteristic indicated by the solid line shows that the engine speed decreases in conformity to the motor speed decrease characteristic from time to, which corresponds to the engine speed N1 at the time an engine stop condition is established, and the engine speed decreases to the prescribed engine speed N2 by time t2.

When fuel injection is continued until the engine speed has decreased to the prescribed engine speed N2 in order to adhere to $NO_x$ emission specifications, the shorter the time needed to decrease to the prescribed engine speed N2, the earlier the timing is at which fuel injection to the engine Eng is stopped. Consequently, in the case of the first embodiment, since the engine speed N1 when an engine stop condition is established can be reduced by the motor/generator MG to the prescribed engine speed N2 of fuel cutoff at the highest reduction slope at which there is no loss of ride comfort, the time taken to reduce the engine speed can be reduced ($\Delta t=t3-t2$), and fuel efficiency can be enhanced while adhering to $NO_x$ emission specifications.

Figure 6:
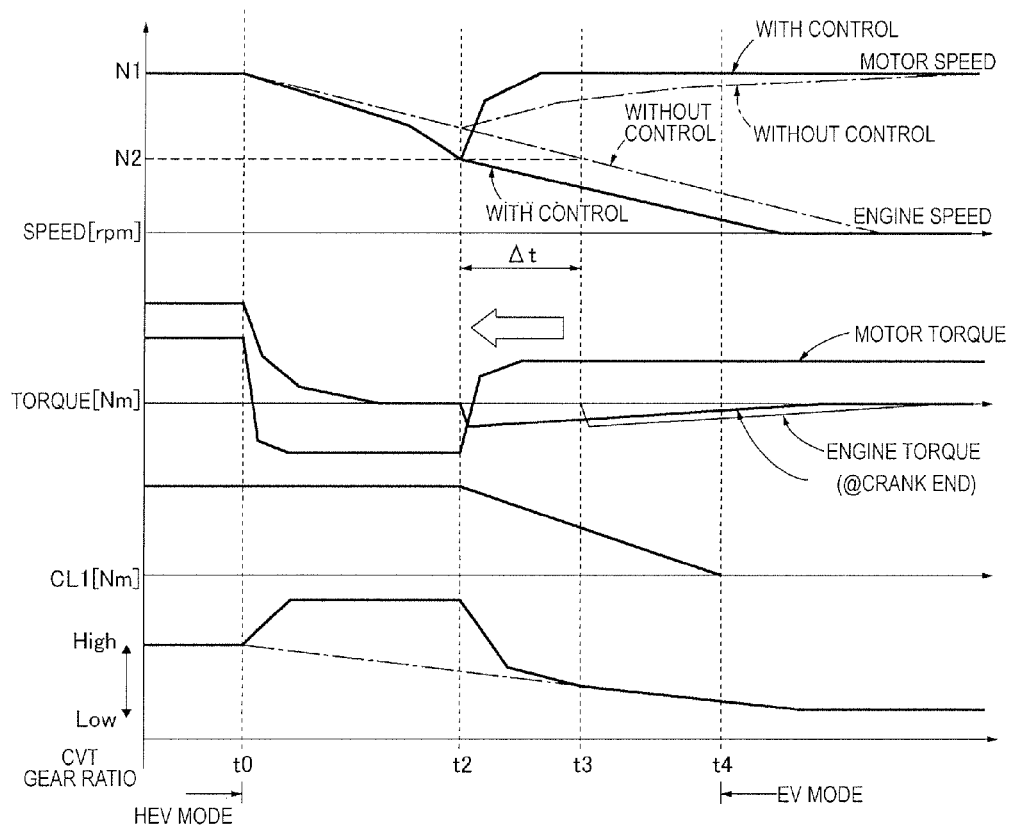
FIG. 6 is a time chart showing the characteristics of engine speed, motor speed, engine torque, motor torque, first clutch capacity and CVT gear ratio when there is no limit to shifting to a higher gear of the automatic transmission CVT in the engine stop control processing executed by the integrated controller of the hybrid vehicle control apparatus of the illustrated embodiment.
Figure 7:
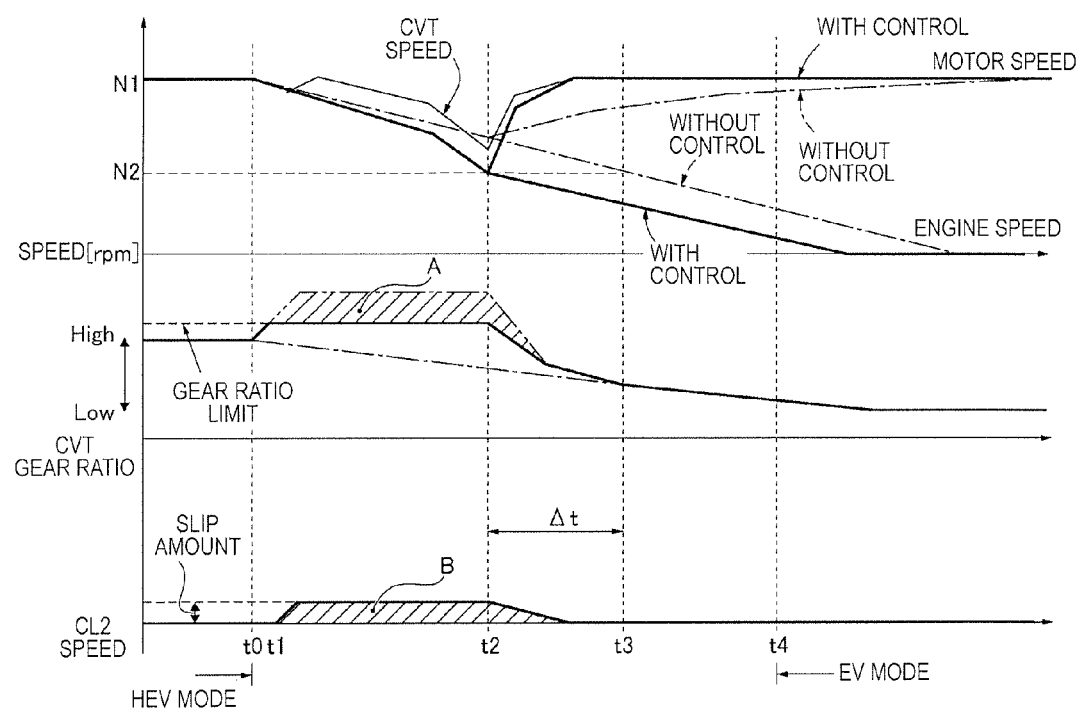
FIG. 7 is a time chart showing the characteristics of engine speed, CVT gear ratio, and second clutch differential rotation when a limit to shifting to higher gears of the automatic transmission CVT has been reached in the engine stop control processing executed by the integrated controller of the hybrid vehicle control apparatus of the illustrated embodiment.

Now the effects for suppressing reduction in vehicle speed will be discussed. In the engine stop control of the first embodiment, the automatic transmission CVT is shifted to a higher gear during reduction of engine speed by the motor/generator MG, and when a limit t is reached, the second clutch CL2 is placed in the slipping engaged state. For example, the time chart shown in FIG. 7 will be used to describe the effects of engine stop control when a limit is imposed on shifting to a higher gear of the automatic transmission CVT for such purposes as ensuring return control to the low side. A case is first assumed in which shifting to a higher gear of the automatic transmission CVT is initiated at time t0, which corresponds to the engine speed N1 at the time an engine stop condition is established, and a limit is imposed at time t1 whereby further shifting to higher gears is not permitted. At this time, the oil pressure to the second clutch CL2 is decreased beginning at time t1, and the second clutch CL2 begins to slip, and the slipping state is continued at a slipping amount B that corresponds to a high-side limit amount A of the gear ratio until time t2 at which the engine speed has decreased to the prescribed engine speed N2. When the engine speed is thereby reduced by motor control, the engine speed characteristic indicated by the solid line in FIG. 7 follows the motor speed decrease characteristic from time t0, which corresponds to the engine speed N1 at the time an engine stop condition is established, the engine speed continues to decrease, and the engine speed decreases to the prescribed engine speed N2 by time t2, the same as shown in FIG. 6.

Specifically, the drive system is configured so that after an engine stop condition is established, when the engine speed N1 is decreased to the prescribed engine speed N2 while fuel injection is continued, the engine Eng is coupled to one side of the motor/generator MG via the first clutch CL1 in the engaged state, and the automatic transmission CVT and the left and right wheels LT and RT are coupled to the other side of the motor/generator MG via the second clutch CL2 in the slipping engaged state. Therefore, although the drive system does not have a differential allowance mechanism in which the engine Eng, the motor/generator MG, the automatic transmission CVT, and the left and right wheels LT and RT are connected in series, the change in speed is the same for the engine Eng and the motor/generator MG, and a relationship of differential rotation is maintained between the engine Eng, the motor/generator MG, and the automatic transmission CVT such that a difference in rotation is allowed between the motor/generator MG and the input speed of the automatic transmission CVT by the slipping engagement of the second clutch CL2.

Consequently, the speed (vehicle speed) of the left and right wheels LT and RT can be prevented from decreasing by the rotation difference absorbing effect created by the slipping of the second clutch CL2 when a limit is reached at which shifting to a higher gear by the automatic transmission CVT cannot be followed, and the vehicle speed cannot be maintained by shifting to a higher gear in engine speed reduction control by the motor/generator MG.

When the limit of shifting to a higher gear in the automatic transmission CVT is reached, the effects on controlling reduction of the engine speed by the motor/generator MG are removed at the same time by the slipping engagement of the second clutch CL2, and the full shortening effect ($\Delta t=t3-t2$) on the time taken to reduce the engine speed is obtained. Fuel efficiency can therefore be enhanced while adhering to $NO_x$ emission specifications.

Furthermore, by causing the second clutch CL2 to slip only when the limit of shifting to a higher gear has been reached, the frequency with which the second clutch CL2 slips and the duration of slipping can be reduced. As a result, the second clutch CL2 can be prevented from overheating and losing durability.

Since allowing the second clutch CL2 to slip causes the gear shifting of the automatic transmission CVT to no longer be limited, returning of the automatic transmission CVT to the low side can be controlled during deceleration prior to stopping the vehicle, for example, and acceleration properties can be enhanced.

Now effects on resumption of travel/re-acceleration will be discussed. In the engine stop control of the first embodiment, during stopping of the engine Eng, the first clutch CL1 is released when the engine speed N1 has decreased to a prescribed engine speed N2, and the gear ratio of the automatic transmission CVT is returned to the gear ratio in effect prior to the decrease in engine speed. Consequently, when engine stop control is completed, since the gear ratio of the automatic transmission CVT has returned toward the low side, travel can be promptly resumed at a high drive torque when travel of the vehicle is subsequently resumed from a stop. Powerful re-acceleration at a high drive torque is also possible when accelerating as a result of depressing the accelerator after engine stop control is completed.

Operation of engine stop control when the engine speed N1<the prescribed engine speed N2 will be discussed. When the engine speed N1 is less than the prescribed engine speed N2 at the time an engine stop condition is established, and the engine speed and motor speed at that time can be maintained, the sequence of step S1→step S2→step S3→step S10→step S11→step S12→step S13→step S15 in the flowchart of FIG. 4 is performed, and the sequence of step S12→step S13→step S15 is repeated insofar as the timer value is less than T1 in step S15. Specifically, the fuel injection stop flag is set in step S10, the current engine speed N1 is maintained in step S11, and the timer value indicating the amount of time that the engine speed is maintained is increased in step S12.

When the motor speed cannot be maintained, the sequence of step S12→step S13→step S14→step S15 is repeated. Specifically, insofar as the determination is made in step S15 that timer value<T1, when the determination is made in step S13 that the rotation of the motor cannot be maintained due to such causes as inability to maintain the primary pulley speed of the automatic transmission CVT, the second clutch CL2 is placed in the slipping engaged state in step S14.

In a state in which the engine speed and the motor speed are maintained, when fuel injection is stopped at the prescribed engine speed N2 from a state in which the engine Eng alone is rotating independently, the process proceeds in the sequence of step S16→step S17→END from step S15 when the set time T1 of the timer value elapses, which is set equal to the time needed for the engine speed to decrease to the engine speed N1. Specifically, in step S16, the first clutch CL1 coupling the engine Eng and the motor/generator MG is released, and in step S17, the gear ratio of the automatic transmission CVT is returned to the gear ratio in effect when engine stop control was initiated. The speed of the motor/generator MG is also correspondingly returned to the motor speed that was in effect when engine stop control was initiated.

In the first embodiment thus configured, when the engine speed N1 is already less than the prescribed engine speed N2

(NO in step S3) when an engine stop condition is established (YES in step S1), fuel injection to the engine Eng is immediately stopped (step S10), the engine Eng is co-rotated by the motor/generator MG and maintained for some time at the current engine speed N1 (step S11 through step S15), the first clutch CL1 is then released (step S16), and engine rotation is stopped. The input speed (primary speed) of the automatic transmission CVT is also equal to the motor speed, but the motor speed must be maintained long enough for the VTC of the engine Eng to return. However, once the motor speed can no longer be maintained (YES in step S13), the oil pressure of the second clutch CL2 is withdrawn, and the second clutch CL2 is allowed to slip (step S14).

As described above, in the engine stop control of the first embodiment, when the engine speed N1 at the time an engine stop condition is established is less than the prescribed engine speed N2, fuel injection is immediately stopped, the engine Eng is co-rotated by the motor/generator MG and maintained at or above a certain engine speed, the first clutch CL1 is released after a prescribed time has elapsed, and the engine is stopped.

Consequently, by ensuring that the engine Eng is co-rotated by the motor/generator MG for a certain time, the VTC of the engine Eng can be reliably returned while keeping fuel consumption low. Restarting of the engine can therefore be assured, and powerful resumption of travel or re-acceleration is possible.

Furthermore, the engine stop control is configured so that the second clutch CL2 is placed in the slipping engaged state when the motor speed can no longer be maintained while the engine speed N1 is being maintained by the motor/generator MG. Consequently, a certain time during which the engine Eng is co-rotated by the motor/generator MG can be ensured, and the VTC of the engine Eng can be reliably returned even when the motor speed cannot be maintained (kept equal to the engine speed N1) by the automatic transmission CVT, left and right wheels LT and RT, and other components disposed downstream from the second clutch CL2.

Effects of the present disclosure will now be described. The effects described below can be obtained by the hybrid vehicle control device according to the first embodiment.

In a hybrid vehicle control device provided with an engine stop control section and a fuel injection control section, the engine stop control section issues an engine speed reduction command to reduce an engine speed of an engine during an engine stopping operation occurring in response to establishment of an engine stop condition, while fuel injection control section issues a fuel injection command to continue fuel injection during the engine stopping operation until the engine speed N1 decreases below a prescribed engine speed N2 whereupon the fuel injection is stopped. The engine stop control section of FIGS. 4 and 5 reduces the engine speed N1 through the use of the motor (motor/generator MG), and places the second or drive-wheel side clutch CL2 in a slipping engaged state. Therefore, although the drive system is a series-connected drive system that does not have a differential allowance mechanism, by maintaining a relationship of differential rotation between the engine Eng, motor (motor/generator MG), and drive wheels (left and right wheels LT and RT), it is possible to simultaneously achieve the effects of maintaining the efficiency of exhaust purification during engine restart, suppressing reduction of vehicle speed, and enhancing fuel efficiency during engine stop control.

In the illustrated embodiment, the automatic transmission CVT is provided between the motor (motor/generator MG) and the drive wheels (left and right wheels LT and RT). The engine stop control section (FIG. 4) issues an automatic transmission shift command to shift the automatic transmission CVT to a higher gear (step S5) when the engine speed is reduced by the motor (motor/generator MG), and issue a drive-wheel side clutch slip engagement command to place the second or drive-wheel side clutch CL2 in a slipping engaged state (step S7) when a limit of gear shifting to the higher gear is reached (YES in step S6). Therefore, by causing the second or drive-wheel side clutch CL2 to slip only when the limit of shifting to a higher gear has been reached, the frequency with which the second or drive-wheel side clutch CL2 slips and the duration of slipping can be reduced. As a result, the second or drive-wheel side clutch CL2 can be prevented from overheating and losing durability. Moreover, since allowing the second or drive-wheel side clutch CL2 to slip causes the gear shifting of the automatic transmission CVT to no longer be limited, returning of the automatic transmission CVT to the low side can be controlled during deceleration prior to stopping the vehicle, for example, and acceleration properties can be enhanced.

The engine stop control section (FIG. 4) issues an engine-side clutch release command to release the first or engine-side clutch CL1 when the engine speed N1 has decreased to a prescribed engine speed N2 (YES in step S8) during stopping of the engine Eng, and issues an automatic transmission shift command to return the gear ratio of the automatic transmission CVT to the gear ratio that was in effect before the engine speed was reduced (step S17). A high torque can therefore be outputted by the motor (motor/generator MG) and the automatic transmission CVT in a low gear ratio as soon as engine stop control is completed, and powerful resumption of travel or re-acceleration is possible.

The engine stop control section (FIG. 5) issues a throttle valve control command to fully close the throttle valve of the engine Eng (step S9 and steps S20-S25) when the engine speed N1 has decreased to the prescribed engine speed N2 (YES in step S8) during stopping of the engine Eng. Therefore, no sudden boosts (negative pressures) occur, fuel adhering to the port walls of the intake manifold does not combine with the injected fuel and flow in to cause richness or peaking of the air/fuel ratio, and exhaust performance can be enhanced.

The engine stop control section (FIG. 4) issues a fuel injection stop command to immediately stop fuel injection upon detecting the engine speed N1 at a time when an engine stop condition is established is less than the prescribed engine speed N2 (step S3→step S10), and issues an engine-side clutch engagement command to control engagement of the first or engine-side clutch CL1 so that the engine Eng is co-rotated by the motor (motor/generator MG) sto maintain the engine speed at or above a given value (step S11) until after a prescribed time has elapsed whereupon the engine stop control section issues an engine-side clutch release command to release the first or engine-side clutch CL1 is released and stop the engine Eng (step S15→step S16). Therefore, by ensuring that the engine Eng is co-rotated by the motor (motor/generator MG) for a certain time, the VTC of the engine Eng can be reliably returned while keeping fuel consumption low. Restarting of the engine Eng can therefore be assured, and powerful resumption of travel or re-acceleration is possible.

The engine stop control section (FIG. 4) issues a drive-wheel side clutch slip engagement command to place the second or drive-wheel side clutch CL2 in a slipping engaged state (step S14) upon determining a given motor speed can no longer be maintained (YES in step S13) while the engine speed N1 is being maintained by the motor (motor/generator MG). Therefore, a certain time during which the engine Eng is co-rotated by the motor/generator MG can be ensured, and the VTC of the engine Eng can be reliably returned even when the motor speed cannot be maintained by the automatic transmission CVT, left and right wheels LT and RT, and other components disposed downstream from the second clutch CL2.

While only selected embodiments have been chosen to illustrate the present invention, it will be apparent to those skilled in the art from this disclosure that various changes and modifications can be made herein without departing from the scope of the invention as defined in the appended claims.

In the first embodiment, the automatic transmission used is a belt-type automatic transmission CVT having a stepless gear ratio whereby the transmission output speed (i.e., the vehicle speed) can be maintained while the transmission input speed (i.e., the motor speed) is gradually reduced so as to conform to engine speed reduction control by the motor/generator MG. However, another type of transmission such as a toroidal automatic transmission CVT, an automatic transmission AT having stepped gear shifting stages, or the like may be used as the automatic transmission. When using a stepped automatic transmission AT, for example, the variation of the speed change gear ratio of the automatic transmission AT is monitored in order to maintain vehicle speed when the engine speed is reduced by the motor, and reduction of the engine speed is controlled in a phased manner so as to follow the variation of the speed change gear ratio. Alternatively, the second clutch CL2 is controlled so as to be maintained in the slipping engaged state while reduction of the engine speed by the motor is controlled.

The second clutch CL2 is described in the first embodiment as being provided between the motor/generator MG and the automatic transmission CVT. However, when a stepped automatic transmission AT is used as the automatic transmission, for example, the second clutch CL2 can be selected from among frictional engaging elements housed in the automatic transmission AT. The second clutch CL2 may also be provided between the automatic transmission and the drive wheels.

The first embodiment was of an application to a one-motor two-clutch hybrid vehicle provided with an automatic transmission. However, the present invention can also be applied to a hybrid vehicle in which the drive system does not have an automatic transmission. In short, the present invention can be applied to a type of hybrid vehicle other than that of the first embodiment insofar as the hybrid vehicle has a drive system in which an engine, a first clutch, a motor, a second clutch, and drive wheels are connected in series. Thus, the foregoing descriptions of the embodiments are provided for illustration only, and not for the purpose of limiting the invention as defined by the appended claims and their equivalents.

What is claimed is:

1. A hybrid vehicle control device comprising:
an engine stop control section configured to issue an engine speed reduction command to reduce an engine speed of an engine during an engine stopping operation occurring in response to establishment of an engine stop condition by using an electric motor and slip engaging a drive-wheel side clutch disposed between the electric motor and a drive wheel such that the drive-wheel side clutch transmits rotational torque between the electric motor and the drive wheel; and
a fuel injection control section configured to issue a fuel injection command to continue fuel injection during the engine stopping operation until the engine speed decreases below a prescribed engine speed whereupon the fuel injection is stopped,
the engine stop control section being further configured to issue an automatic transmission shift command to shift an automatic transmission, that is disposed between the electric motor and the drive wheel, to a higher gear according to a reduction of a motor speed of the electric motor as the engine speed is reduced by the electric motor, and
the engine stop control section being further configured to issue a drive-wheel side clutch slip engagement command to slip engage the drive-wheel side clutch upon reaching a limit of gear shifting to the higher gear.

2. The hybrid vehicle control device according to claim 1, wherein
the engine stop control section is configured to issue an engine-side clutch release command to release an engine-side clutch that is disposed between the engine and the electric motor upon detecting the engine speed has decreased below the prescribed engine speed during the engine stopping operation, and
the engine stop control section is configured to issue an automatic transmission shift command to return a gear ratio of the automatic transmission to the gear ratio that was in effect prior to reduction of the engine speed.

3. The hybrid vehicle control device according to claim 2, wherein
the engine stop control section is configured to issue a throttle valve control command to fully close a throttle valve of the engine upon detecting the engine speed has decreased below the prescribed engine speed during the engine stopping operation.

4. The hybrid vehicle control device according to claim 1, wherein the engine stop control section is further configured to issue a throttle valve control command to fully close a throttle valve of the engine in response to detecting the engine speed has decreased below the prescribed engine speed during the engine stopping operation.

5. The hybrid vehicle control device according to claim 1, wherein
the engine stop control section is configured to issue a throttle valve control command to fully close a throttle valve of the engine upon detecting the engine speed has decreased below the prescribed engine speed during the engine stopping operation.

6. A hybrid vehicle control device comprising:
an engine stop control section configured to issue an engine speed reduction command to reduce an engine speed of an engine during an engine stopping operation occurring in response to establishment of an engine stop condition by using an electric motor and slip engaging a drive-wheel side clutch disposed between the electric motor and a drive wheel such that the drive-wheel side clutch transmits rotational torque between the electric motor and the drive wheel; and
a fuel injection control section configured to issue a fuel injection command to continue fuel injection during the engine stopping operation until the engine speed decreases below a prescribed engine speed whereupon the fuel injection is stopped,
the fuel injection control section being further configured to issue a fuel injection stop command to immediately stop fuel injection upon detecting the engine speed is below the prescribed engine speed at a time when an engine stop condition is established, and
the engine stop control section being further configured to issue an engine-side clutch engagement command to control engagement of an engine-side clutch that is disposed between the engine and the electric motor so that the engine is co-rotated by the electric motor to maintain the engine speed at or above a given value until after a prescribed time has elapsed whereupon the engine stop control section issues an engine-side clutch release command to release the engine-side clutch and stop the engine.

7. The hybrid vehicle control device according to claim 6, wherein
the engine stop control section is configured to issue a drive-wheel side clutch slip engagement command to place the drive-wheel side clutch in a slipping engaged state upon determining a given motor speed can no longer be maintained while the engine speed is being maintained by the electric motor.

8. The hybrid vehicle control device according to claim 6, wherein
the engine stop control section is configured to issue an automatic transmission shift command to shift an automatic transmission, that is disposed between the electric motor and the drive wheel, to a higher gear as the engine speed is reduced by the electric motor, and
the engine stop control section is configured to issue a drive-wheel side clutch slip engagement command to slip engage the drive-wheel side clutch upon reaching a limit of gear shifting to the higher gear.

9. The hybrid vehicle control device according to claim 8, wherein
the engine stop control section is configured to issue a drive-wheel side clutch slip engagement command to place the drive-wheel side clutch in a slipping engaged state upon determining a given motor speed can no longer be maintained while the engine speed is being maintained by the electric motor.

10. The hybrid vehicle control device according to claim 6, wherein
the engine stop control section is configured to issue an engine-side clutch release command to release the engine-side clutch that is disposed between the engine and the electric motor upon detecting the engine speed has decreased below the prescribed engine speed during the engine stopping operation, and
the engine stop control section is configured to issue an automatic transmission shift command to return the gear ratio of the automatic transmission to the gear ratio that was in effect prior to reduction of the engine speed.

11. The hybrid vehicle control device according to claim 10, wherein
the engine stop control section is configured to issue a drive-wheel side clutch slip engagement command to place the drive-wheel side clutch in a slipping engaged state upon determining a given motor speed can no longer be maintained while the engine speed is being maintained by the electric motor.

12. The hybrid vehicle control device according to claim 6, wherein
the engine stop control section is configured to issue a throttle valve control command to fully close a throttle valve of the engine upon detecting the engine speed has decreased below the prescribed engine speed during the engine stopping operation.

13. The hybrid vehicle control device according to claim 12, wherein
the engine stop control section is configured to issue a drive-wheel side clutch slip engagement command to place the drive-wheel side clutch in a slipping engaged state upon determining a given motor speed can no longer be maintained while the engine speed is being maintained by the electric motor.

* * * * *